US011807088B2

(12) United States Patent
Albers et al.

(10) Patent No.: US 11,807,088 B2
(45) Date of Patent: Nov. 7, 2023

(54) OPEN ROOF CONSTRUCTION FOR A VEHICLE

(71) Applicant: Inalfa Roof Systems Group B.V., Oostrum (NL)

(72) Inventors: Thomas Anton Martijnszoon Albers, Venray (NL); Eduardus Christianus Henricus van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/554,774

(22) Filed: Dec. 17, 2021

(65) Prior Publication Data

US 2022/0194192 A1    Jun. 23, 2022

(30) Foreign Application Priority Data

Dec. 22, 2020  (EP) ...................................... 20216345

(51) Int. Cl.
*B60J 7/02* (2006.01)
*B60J 7/04* (2006.01)
(Continued)

(52) U.S. Cl.
CPC .................. *B60J 7/057* (2013.01); *B60J 7/02* (2013.01); *B60J 7/04* (2013.01); *B60J 7/043* (2013.01);
(Continued)

(58) Field of Classification Search
CPC ....... B60J 7/02; B60J 7/04; B60J 7/043; B60J 7/0435; B60J 7/047; B60J 7/05; B60J 7/053; B60J 7/057; E05Y 2201/626
(Continued)

(56) References Cited

U.S. PATENT DOCUMENTS 4,272,124 A    6/1981  Schatzler et al.
5,154,482 A *  10/1992 Hayashi ................. B60J 7/0435
                                              296/216.06
(Continued)

FOREIGN PATENT DOCUMENTS

EP    638452 A1 *  2/1995  ............ B60J 7/0435
JP    3409368 B2 *  5/2003  ................ B60J 7/05

OTHER PUBLICATIONS

Benet, "Closing or at least partially opening system for a cover of a tilting-sliding roof", Feb. 15, 1995, European Patent Office, Edition: EP638452A1 (Year: 1995).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

An open roof construction for a vehicle comprises at least a movable lever to which, by means of a pin-like member, a slide shoe is connected that, for defining a movement of the movable lever, cooperates with and moves longitudinally along a guide. The pin-like member at a first end is connected to said lever and at a second end is connected to said slide shoe and the guide and slide shoe are provided with at least one pair of cooperating guide part and slide shoe part. The pin-like member at its second end is provided with an enlarged head configured to engage the slide shoe at a side thereof facing away from the lever. The dimensions of the enlarged head are such that, as seen in a direction from the enlarged head towards the lever, at least part of said enlarged head overlaps at least one guide part.

20 Claims, 11 Drawing Sheets

(51) Int. Cl.
  *B60J 7/043* (2006.01)
  *B60J 7/047* (2006.01)
  *B60J 7/05* (2006.01)
  *B60J 7/053* (2006.01)
  *B60J 7/057* (2006.01)

(52) U.S. Cl.
  CPC .............. *B60J 7/047* (2013.01); *B60J 7/0435* (2013.01); *B60J 7/05* (2013.01); *B60J 7/053* (2013.01)

(58) Field of Classification Search
  USPC ....................................... 296/216.05, 216.08
  See application file for complete search history.

(56) References Cited

U.S. PATENT DOCUMENTS

2005/0127719 A1* 6/2005 Sawada .................... B60J 7/024
                                                     296/216.03
2006/0082193 A1   4/2006 Braun et al.

OTHER PUBLICATIONS

Woods et al., "Vehicle Sun Roof Apparatus", May 26, 2003, Japanese Patent Office, Edition: JP3409368B2 (Year: 2003).*
European Search Report in corresponding European Patent Application No. 20216345.7 dated May 19, 2021, 8 pages.

* cited by examiner

OPEN ROOF CONSTRUCTION FOR A VEHICLE

BACKGROUND

The discussion below is merely provided for general background information and is not intended to be used as an aid in determining the scope of the claimed subject matter.

Aspects of the invention relates to an open roof construction for a vehicle, comprising a panel and a moving mechanism intended for moving the panel between different positions, wherein the moving mechanism comprises at least a movable lever to which, by means of a pin-like member, a slide shoe is connected that, for defining a movement of the movable lever, cooperates with and moves longitudinally along a guide, wherein the pin-like member at a first end is connected to said lever and at a second end is connected to said slide shoe and wherein the guide and slide shoe are provided with at least one pair of cooperating guide part and slide shoe part.

In such an open roof construction the slide shoe contributes to defining the movement of the lever, and thus to the movement of the panel (for example between closed and open positions thereof). To ensure a safe operation of the open roof construction in general, and a reliable positioning of the panel in its different positions specifically, a proper cooperation between the slide shoe and the guide should be assured at any moment. Especially it should be avoided that in case of a crash situation (for example with the panel in its open position) the forces generated (even at low speeds) cause the slide shoe to disengage (partly or fully) from the guide.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention provides an open roof construction in which a proper cooperation between the slide shoe and guide is maintained through a very large range of operational circumstances.

The open roof construction includes the pin-like member at its second end (where it is connected to the slide shoe) and is provided with an enlarged head intended for engaging the slide shoe at a side thereof facing away from the lever, wherein the dimensions of the enlarged head are such that, as seen in a direction from the enlarged head towards the lever, at least part of said enlarged head overlaps at least one guide part.

It appeared that as a result of said overlap between the enlarged head and at least one guide part a proper cooperation between the slide shoe and guide (as occurs at the interface between the cooperating guide part and slide shoe part) even can be assured under severe conditions, such as a crash situation (for example with the panel in its open position). The enlarged head may limit or prevent a deformation of the slide shoe.

In one embodiment of the open roof construction the guide is provided with two guide parts at opposite sides of the pin-like member (commonly above and below the pin-like member when the slide shoe moves in a substantially horizontal direction, as will be the case in most open roof constructions of the type the present invention relates to), whereas the slide shoe (likewise) is provided with two slide shoe parts at opposite sides of the pin-like member, such as to define two opposite pairs of cooperating guide part and slide shoe part.

In such an embodiment the enlarged head of the pin-like member may overlap with only one guide part, but when the enlarged head has such a design that it overlaps both opposite guide parts, the favourable effect obtained can be maximised.

In one embodiment the enlarged head has an asymmetrical design. This may result in a different amount of overlap with respect to different guide parts, or it may result from a specific design of the slide shoe (for example when the pin-like member does not have a central position in the slide shoe).

In one embodiment comprising two of said pairs of cooperating guide part and slide shoe part, both opposite pairs of cooperating guide part and slide shoe part are located between the enlarged head and the lever. In such an embodiment the enlarged head in an overlapping manner will cooperate with both guide parts.

In another embodiment comprising two of said pairs of cooperating guide part and slide shoe part, only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the enlarged head facing away from the lever. In such an embodiment the enlarged head in an overlapping manner will only cooperate with the guide part of the first pair.

In yet another embodiment of the open roof construction which also comprises two of said pairs of cooperating guide part and slide shoe part, again only a first one of said opposite pairs of cooperating guide part and slide shoe part is located between the enlarged head and the lever, at the side of the enlarged head facing towards the lever, whereas the second one of said opposite pairs of cooperating guide part and slide shoe part now is located at the side of the lever facing away from the enlarged head.

In one embodiment the slide shoe is provided with a reinforcement member extending at least partially between the enlarged head and a pair of cooperating guide part and slide shoe part. Such a reinforcement member, which at least partially, and preferably entirely, may be embedded in the slide shoe, adds to the resistance of the slide shoe against disengaging from the guide by increasing the stiffness of the slide shoe. The reinforcement member may reduce deformations of the slide shoe and further may improve a transmission of forces between the enlarged head and a guide part. Such a reinforcement member, for example, may comprise a plate or disc made of a rigid material, such as plastic or metal and may have a wide range of shapes and dimensions, depending on the features of the slide shoe.

In an embodiment of the open roof construction which again comprises two of said pairs of cooperating guide part and slide shoe part, the reinforcement member may extend between the enlarged head and both opposite pairs of cooperating guide part and slide shoe part, also when only one of said pairs is located between the enlarged head and the lever. However, this does not preclude the possibility that the reinforcement member extends in another manner.

For example, it is possible that the reinforcement member firstly extends between the enlarged head and the first one of said opposite pairs of cooperating guide part and slide shoe part and secondly extends at the side of the second one of said opposite pairs of cooperating guide part and slide shoe part facing away from the lever.

The respective cooperating guide parts and slide shoe parts may comprise longitudinally extending guide walls and longitudinally extending slide shoe recesses, respectively.

When the open roof construction comprises two of said pairs of cooperating guide part and slide shoe part, most commonly the first one of said opposite pairs of cooperating guide part and slide shoe part is positioned above the pin-like member, whereas the second one of said opposite pairs of cooperating guide part and slide shoe part is positioned below the pin-like member, especially when the slide shoe carries out a horizontal movement along the guide.

In one embodiment the lever is U-shaped in the region where the pin-like member is attached thereto. This may provide constructional and/or functional advantages.

BRIEF DESCRIPTION OF DRAWINGS

Hereinafter the invention will be elucidated by means of the drawings, in which.

DETAILED DESCRIPTION

Figure 1:
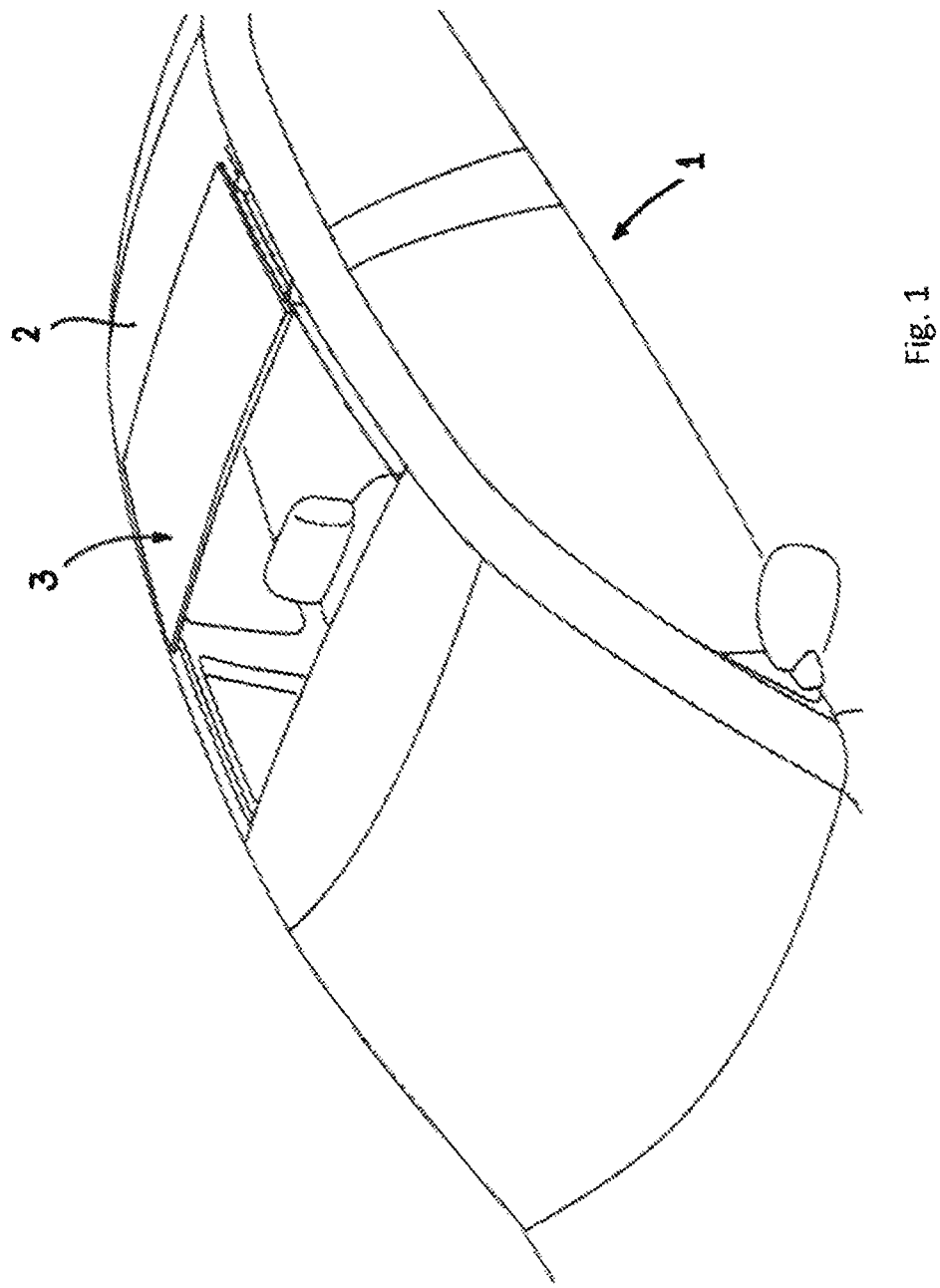
FIG. 1 illustrates a general view of a vehicle provided with an open roof construction, comprising a panel which is shown in an open position.
Figure 2:
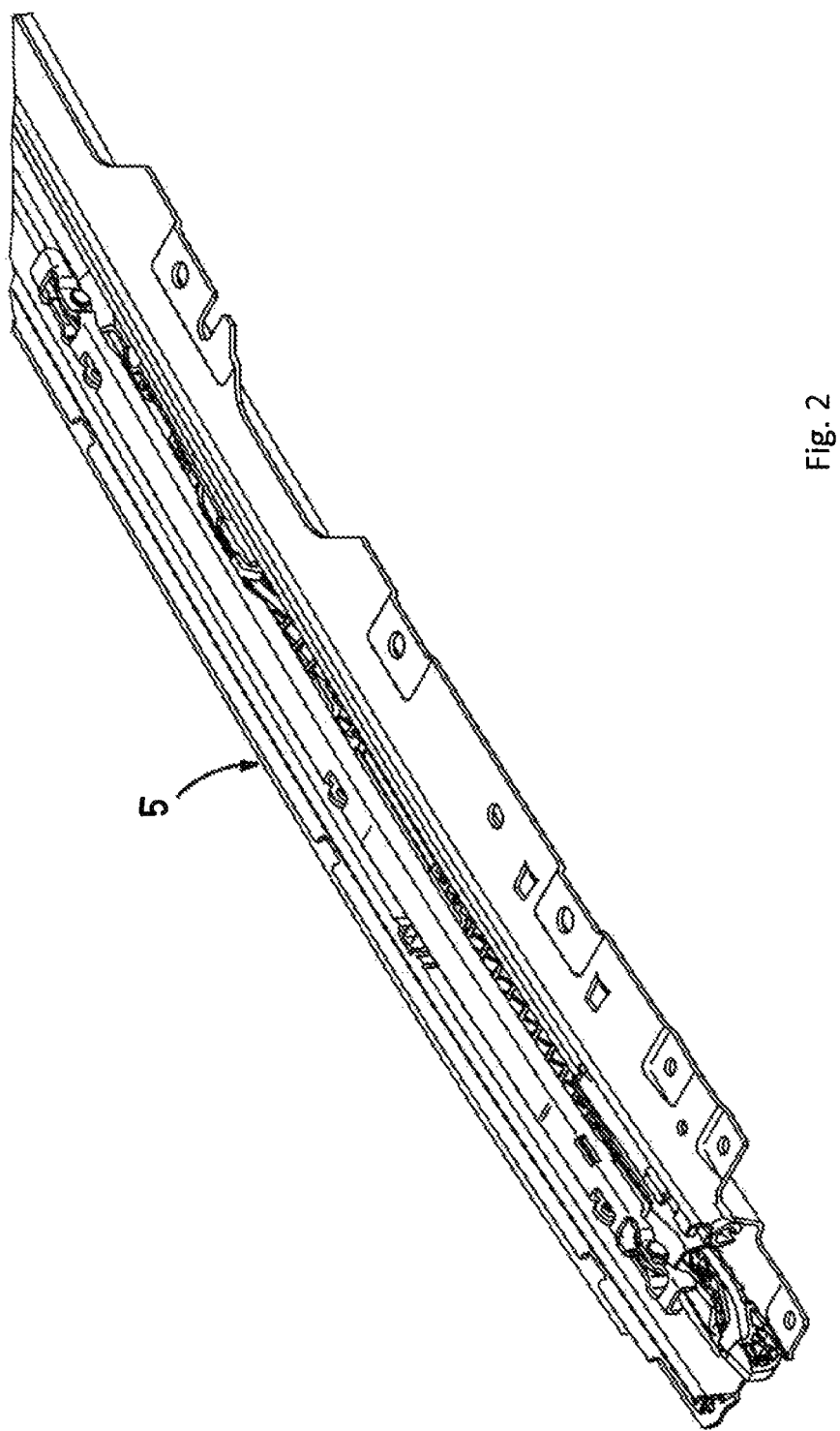
FIG. 2 illustrates part of a moving mechanism for the panel.
Figure 3:
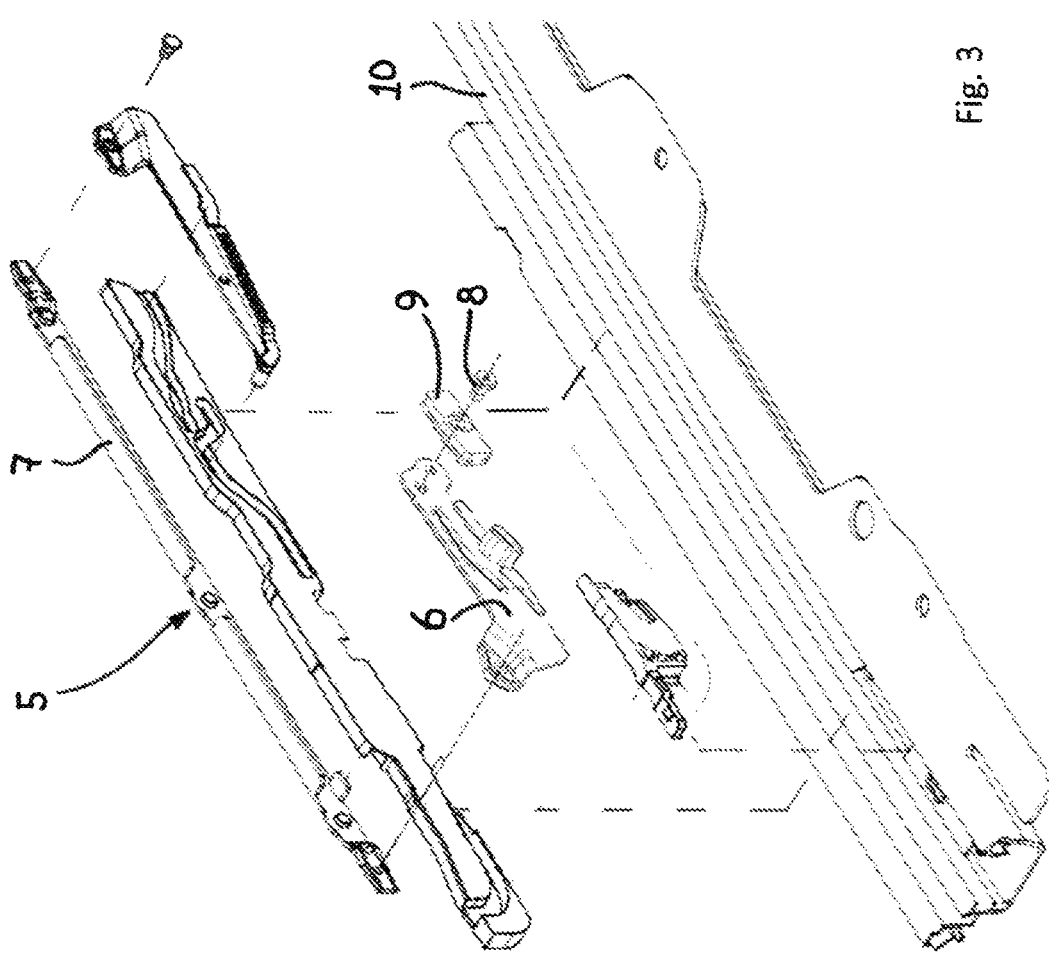
FIG. 3 shows an exploded view of said part of the moving mechanism.
Figure 4:
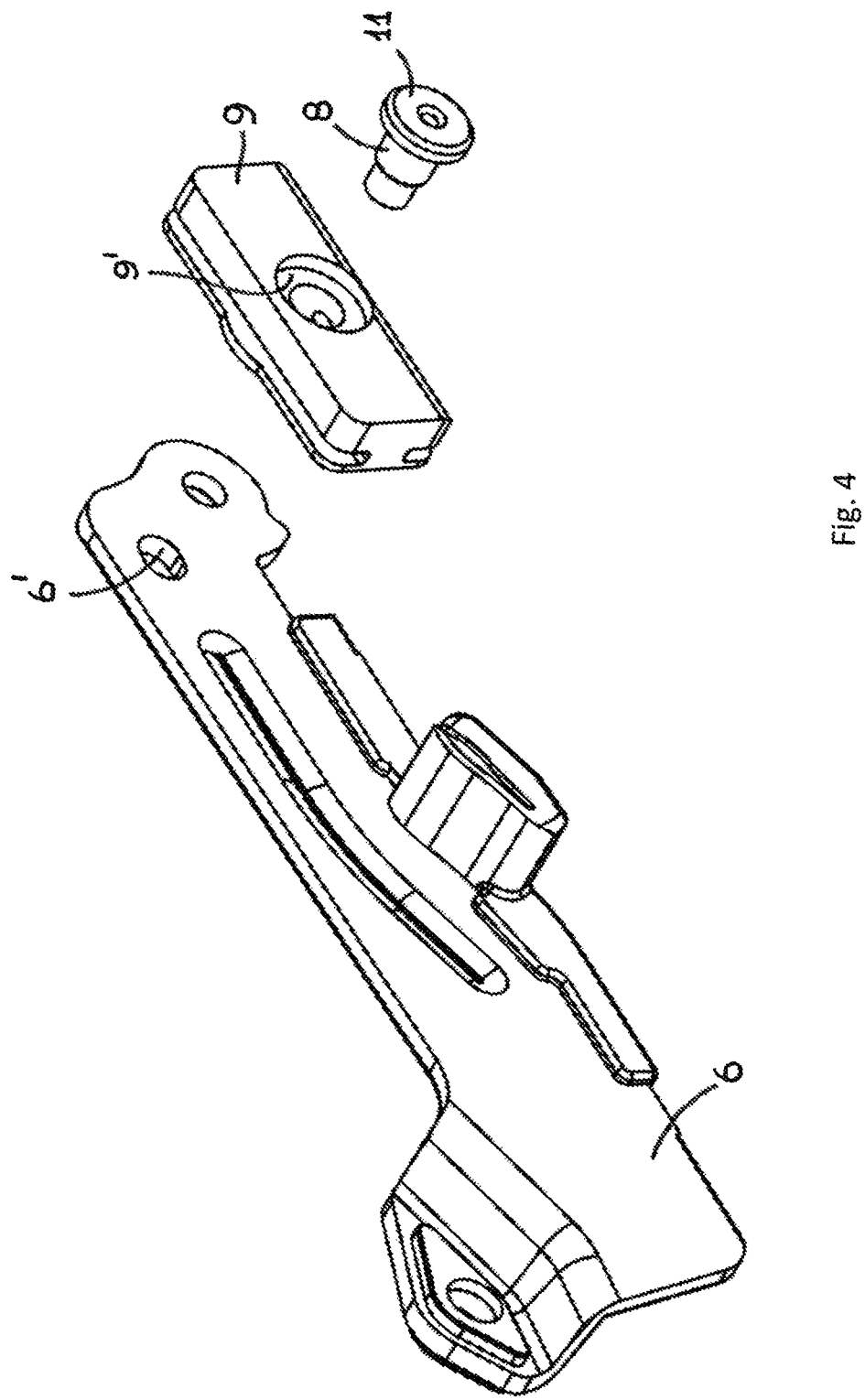
FIG. 4 shows a lever, slide shoe and pin-like member in a disassembled state.

In FIG. 1 part of a vehicle 1 is shown which in its stationary roof 2 is provided with an open roof construction 3. Part of the open roof construction is a panel 4 which can be moved between different positions (such as a closed position and the open position illustrated in FIG. 1) by means of a moving mechanism 5 (see FIG. 2).

The precise construction and operation of the moving mechanism 5 is not relevant for the present invention. It only is important that it firstly comprises at least a movable lever 6 (FIGS. 3-11). The movable lever 6 may be a front lever attached to a support 7 for the panel 4, but it is noted that the invention is not limited to such a specific type of lever.

A pin-like member 8 (for example a pin or bolt) with a first end is connected to the lever 6 (for example inserted in a hole 6' of the lever) and with a second end is connected to a slide shoe 9 (for example partly housed in a recess 9' of the slide shoe), thus connecting the slide shoe 9 to the lever 6 (while generally allowing the slide shoe 9 to rotate with respect to the lever 6). The slide shoe 9, for defining a movement of the movable lever 6, cooperates with and moves longitudinally along a guide 10. For this, the guide 10 and slide shoe 9 are provided with at least one pair of cooperating guide part and slide shoe part, as will be explained in detail below while discussing the FIGS. 5-11.

As will appear below, the pin-like member 8 at its second end is provided with an enlarged head 11 intended for engaging the slide shoe 9 at a side thereof facing away from the lever 6. The dimensions of the enlarged head 11 are such that, as seen in a direction from the enlarged head 11 towards the lever 6, at least part of said enlarged head 11 overlaps at least one guide part.

Figure 5:
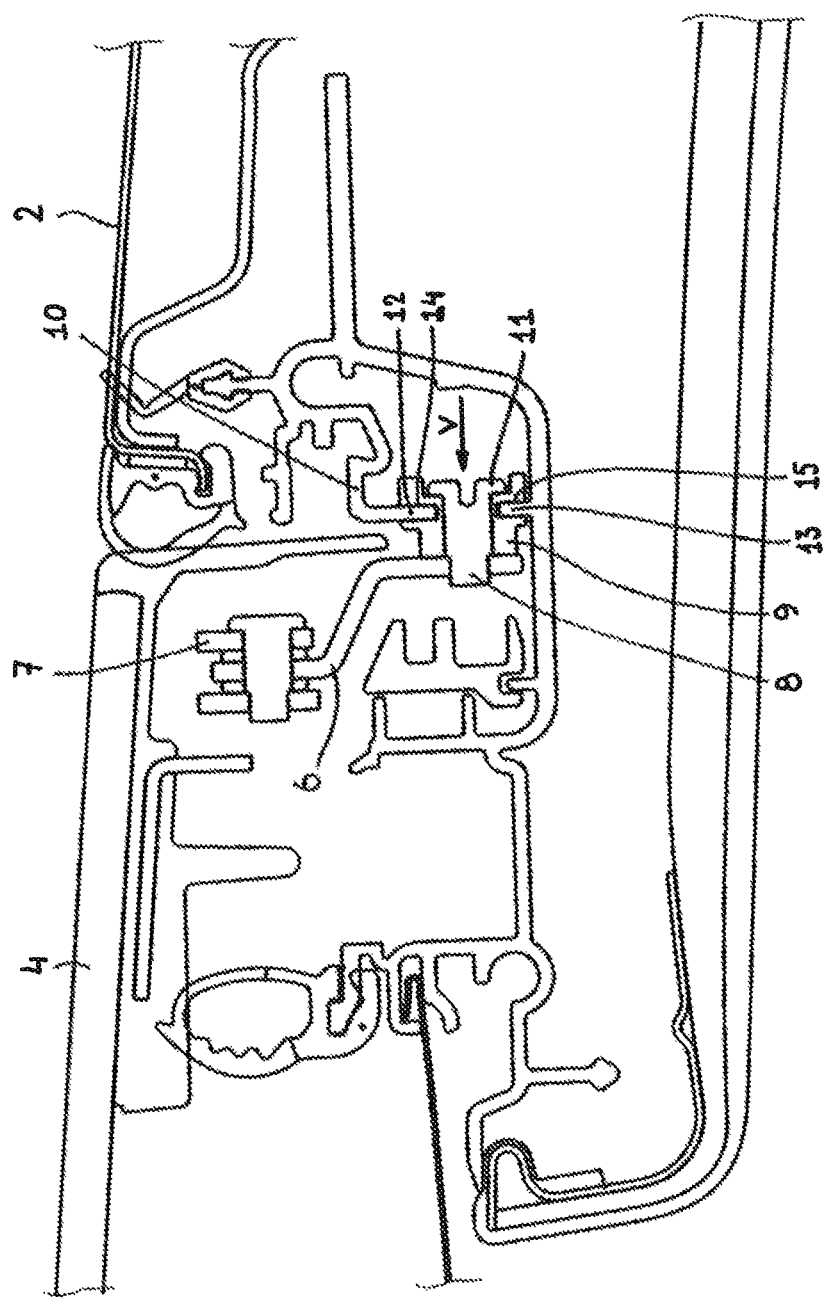
FIGS. 5-11 show cross-sectional views of different embodiments of the open roof construction according to the present invention.

Referring to FIG. 5, an embodiment is illustrated in cross section in which the guide 10 is provided with two guide parts 12,13 (for example wall parts) at opposite (here upper and lower) sides of the pin-like member 8 and positioned between the enlarged head 11 and the lever 6. The slide shoe 9 is provided with two corresponding slide shoe parts 14,15 (for example recesses) at opposite sides of the pin-like member cooperating with the guide parts 12,13, such as to define two opposite pairs 12,14 and 13,15 each of which comprises a guide part 12,13 and a slide shoe part 14,15 cooperating with each other.

In FIG. 5 one can see that, as seen in the viewing direction according to arrow V, the enlarged head 11 of the pin-like member 8 overlaps both the guide parts 12 and 13 (in this embodiment one also could say that the width of a gap defined between the opposite guide parts 12 and 13 is smaller than the diameter or width of the enlarged head 11).

Figure 6:
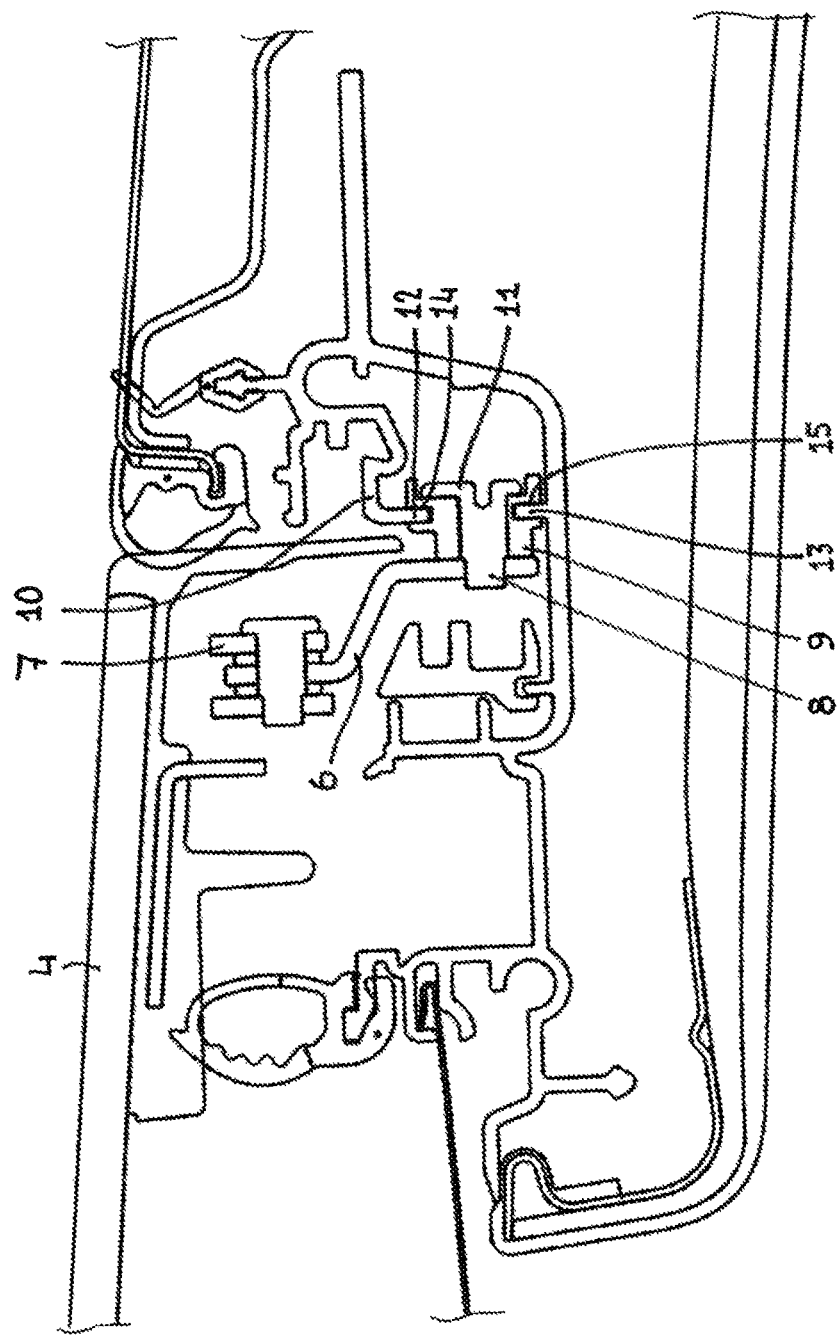
Figure 7:
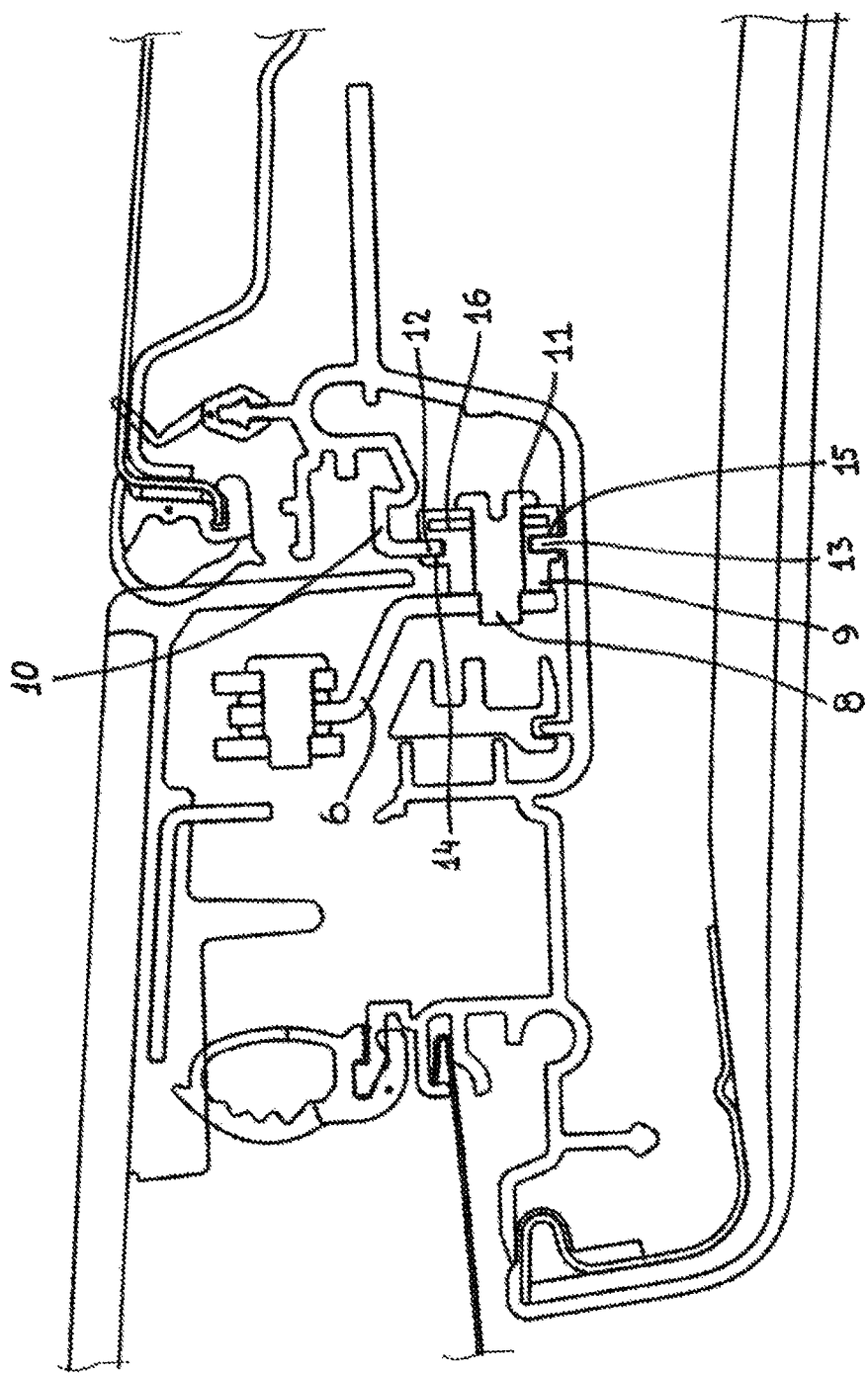

The embodiment according to FIG. 6 is similar to that according to FIG. 5, but in this embodiment the enlarged head 11 has an asymmetrical design.

In FIG. 7 again an embodiment is illustrated similar to that of FIG. 5. Now, however, the slide shoe 9 additionally is provided with a reinforcement member 16 extending (at least partially) between the enlarged head 11 and the two pairs 12,14 and 13,15 of cooperating guide part and slide shoe part. In the illustrated embodiment the reinforcement member 16 is at least partially, and preferably entirely, embedded in the slide shoe 9.

Figure 8:
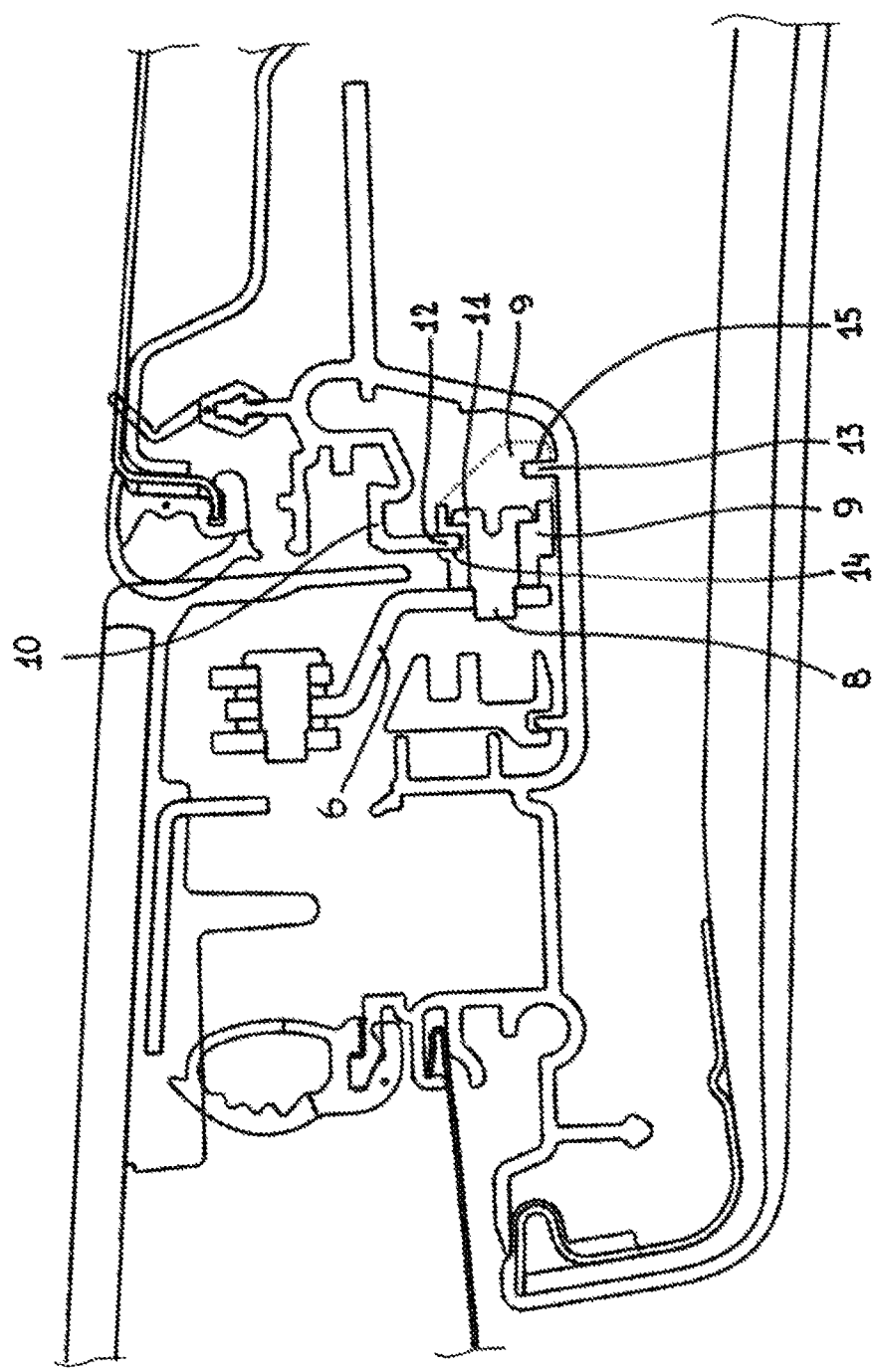

In the embodiment illustrated in FIG. 8 only a first pair 12,14 of said opposite pairs of cooperating guide part and slide shoe part is located between the enlarged head 11 and the movable lever 6 (or, in other words, at the side of the enlarged head 11 facing towards the movable lever 6, in this figure at the left from the enlarged head 11), whereas the second pair 13,15 of said opposite pairs of cooperating guide part and slide shoe part is located at the side of the enlarged head 11 facing away from the lever 6 (in this figure at the right from the enlarged head 11).

Figure 9:
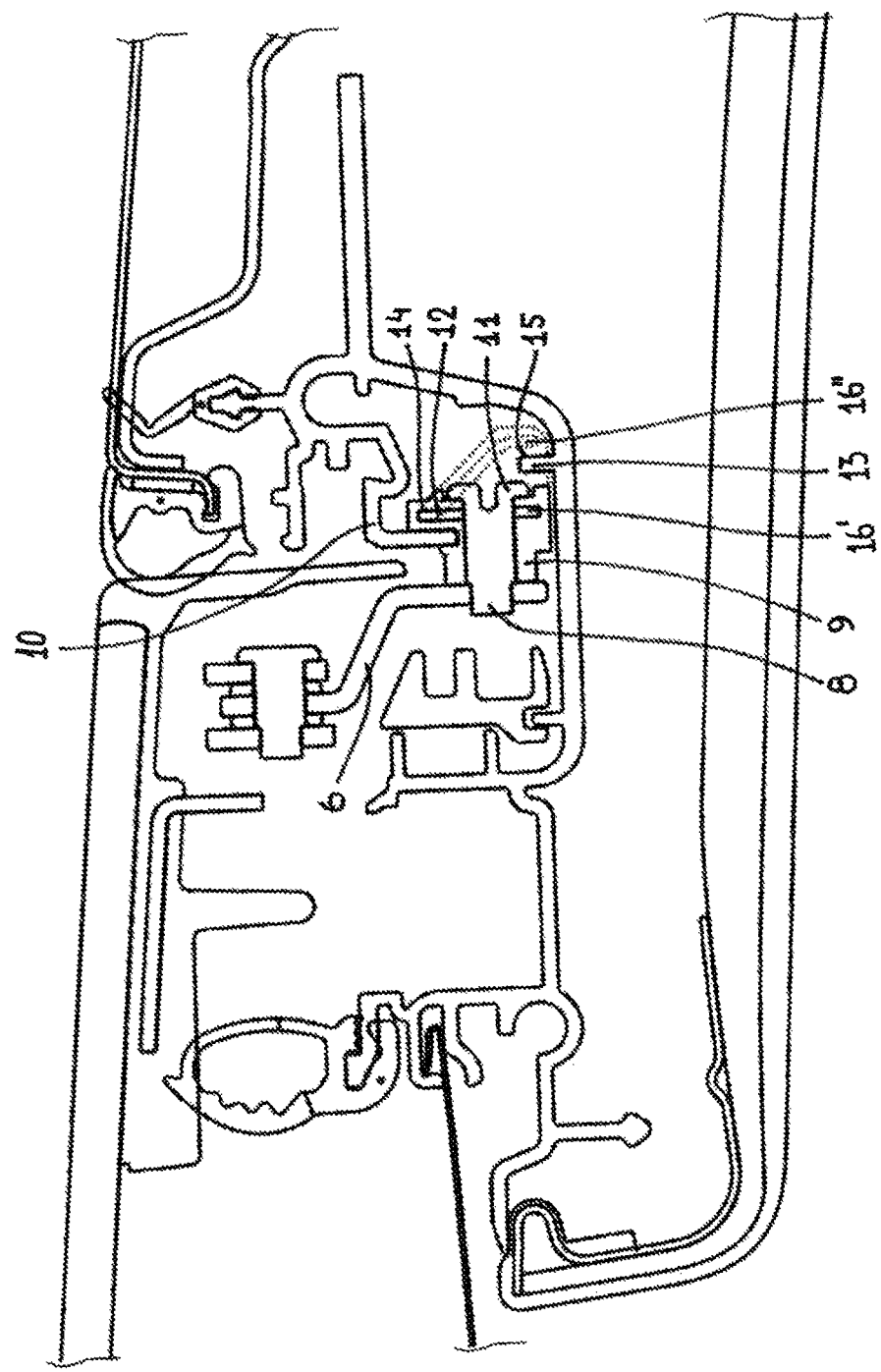

Now referring to FIG. 9, an embodiment is illustrated which bears much resemblance with the previous embodiment but which now, additionally, is provided with a reinforcement member. As illustrated, a first part 16' of the reinforcement member extends between the enlarged head 11 and the first pair 12,14 of said opposite pairs of cooperating guide part and slide shoe part, whereas a second part 16" of the reinforcement member extends at the side of the second pair 13,15 of said opposite pairs of cooperating guide part and slide shoe part facing away from the lever 6 (in this figure at the right side of said pair 13,15).

It should be noted that it also is possible that the reinforcement member only comprises the first part 16' or only comprises the second part 16".

Figure 10:
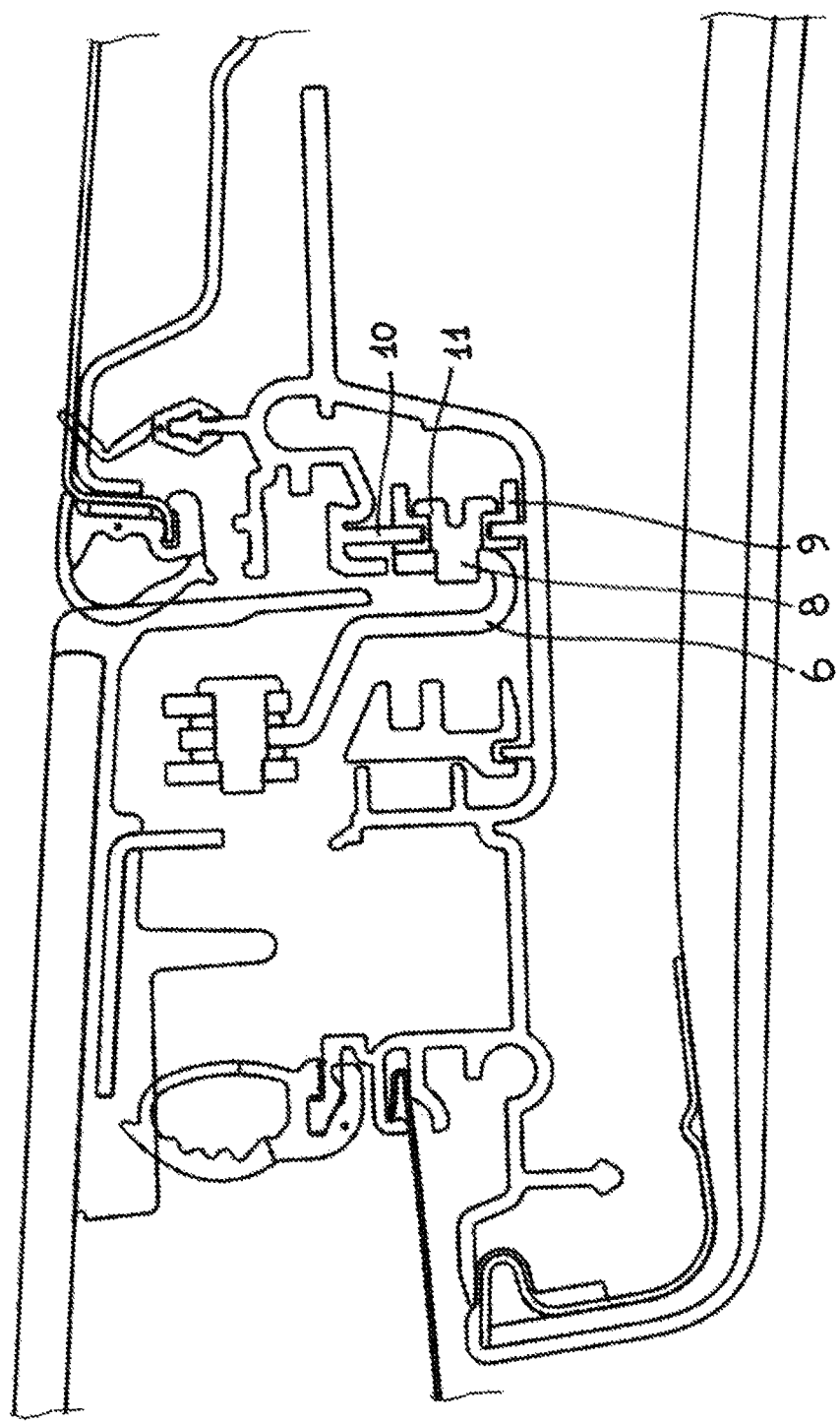

The embodiment illustrated in FIG. 10 is quite similar to that illustrated in FIG. 5, but in this embodiment the lever 6 is U-shaped in the region where the pin-like member 8 is attached thereto.

Figure 11:
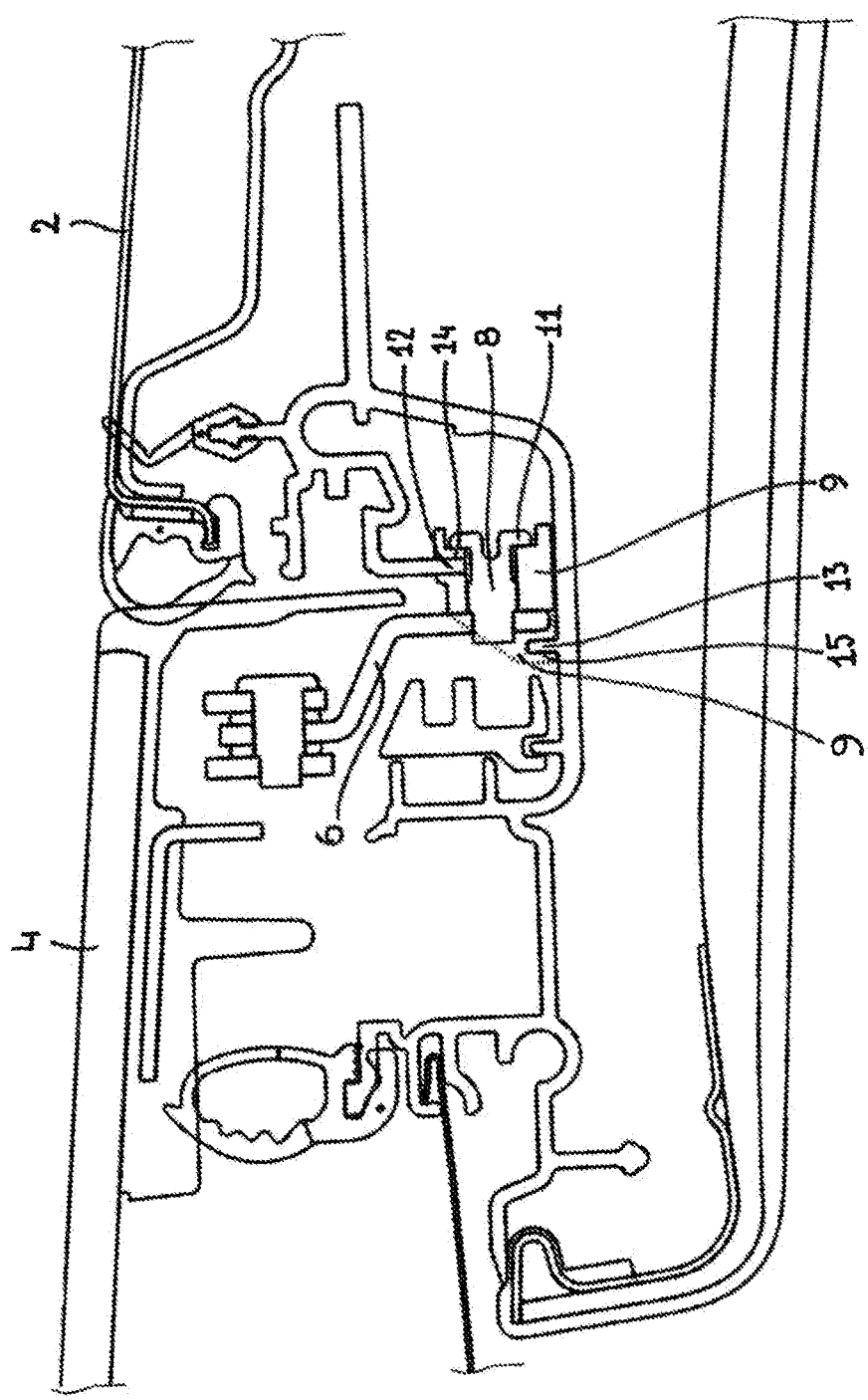

Finally, FIG. 11 illustrates an embodiment in which, again, only the first pair 12,14 of said opposite pairs of cooperating guide part and slide shoe part is located between the enlarged head 11 and the lever 6 (at the side of the enlarged head 11 facing towards the lever 6), whereas the second pair 13,15 of said opposite pairs of cooperating guide part and slide shoe part is located at the side of the lever 6 facing away from the enlarged head 11 (thus, in this figure at the left of the lever 6).

Of course, the positions of the first and second pairs 12,14 and 13,15 could be exchanged (for example in FIG. 11 the (upper) first pair 12,14 could be positioned at the left of the lever 6, whereas the (lower) second pair 13,15 then would be positioned between the lever 6 and the enlarged head 11).

The invention is not limited to the embodiments described before which may be varied widely within the scope of the invention as defined by the appending claims.

What is claimed is:

1. An open roof construction for a vehicle, comprising:
   a panel;
   a guide; and
   a moving mechanism configured to move the panel between different positions, the moving mechanism comprising:
      at least a movable lever;
      a slide shoe that cooperates with and moves longitudinally along the guide; and
      a pin-like member, wherein the pin-like member at a first end is connected to said lever and at a second end is connected to said slide shoe and wherein the guide and slide shoe are provided with at least one pair of cooperating guide part and slide shoe part, wherein the pin-like member at its second end is provided with an enlarged head configured to engage the slide shoe at a side thereof facing away from the lever, wherein dimensions of the enlarged head are such that, as seen in a direction from the enlarged head towards the lever, at least part of said enlarged head overlaps at least one guide part.

2. The open roof construction according to claim 1, wherein the guide is provided with two guide parts at opposite sides of the pin-like member, whereas the slide shoe is provided with two slide shoe parts at opposite sides of the pin-like member, such as to define two opposite pairs of cooperating guide part and slide shoe part.

3. The open roof construction according to claim 2, wherein the enlarged head is configured so as to overlap both opposite guide parts.

4. The open roof construction according to claim 3, wherein the enlarged head has an asymmetrical design.

5. The open roof construction according to claim 2, wherein both opposite pairs of cooperating guide part and slide shoe part are located between the enlarged head and the lever.

6. The open roof construction according to claim 3, wherein both opposite pairs of cooperating guide part and slide shoe part are located between the enlarged head and the lever.

7. The open roof construction according to claim 2, wherein only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the enlarged head facing away from the lever.

8. The open roof construction according to claim 3, wherein only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the enlarged head facing away from the lever.

9. The open roof construction according to claim 2, wherein only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the lever facing away from the enlarged head.

10. The open roof construction according to claim 3, wherein only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the lever facing away from the enlarged head.

11. The open roof construction according to claim 1, wherein the slide shoe is provided with a reinforcement member extending at least partially between the enlarged head and a pair of cooperating guide part and slide shoe part.

12. The open roof construction according to claim 11, wherein the reinforcement member is at least partially embedded in the slide shoe.

13. The open roof construction according to claim 12, wherein the reinforcement member is entirely embedded in the slide shoe.

14. The open roof construction according to claim 11, wherein both opposite pairs of cooperating guide part and slide shoe part are located between the enlarged head and the lever, and wherein the reinforcement member extends between the enlarged head and both opposite pairs of cooperating guide part and slide shoe part.

15. The open roof construction according to claim 12, wherein both opposite pairs of cooperating guide part and slide shoe part are located between the enlarged head and the lever, and wherein the reinforcement member extends between the enlarged head and both opposite pairs of cooperating guide part and slide shoe part.

16. The open roof construction according to claim 11, wherein only a first one of said opposite pairs of cooperating guide part and slide shoe part is located between the enlarged head and the lever, at the side of the enlarged head facing towards the lever, whereas the second one of said opposite pairs of cooperating guide part and slide shoe part is located at the side of the enlarged head facing away from the lever, and wherein the reinforcement member firstly extends between the enlarged head and the first one of said opposite pairs of cooperating guide part and slide shoe part and secondly extends at the side of the second one of said opposite pairs of cooperating guide part and slide shoe part facing away from the lever.

17. The open roof construction according to claim 1, wherein the respective cooperating guide parts and slide shoe parts comprise longitudinally extending guide walls and longitudinally extending slide shoe recesses, respectively.

18. The open roof construction according to claim 7, wherein the first one of said opposite pairs of cooperating guide part and slide shoe part is positioned above the pin-like member, whereas the second one of said opposite pairs of cooperating guide part and slide shoe part is positioned below the pin-like member.

19. The open roof construction according to claim 9, wherein the first one of said opposite pairs of cooperating guide part and slide shoe part is positioned above the pin-like member, whereas the second one of said opposite pairs of cooperating guide part and slide shoe part is positioned below the pin-like member.

20. The open roof construction according to claim 1, wherein the lever is U-shaped in the region where the pin-like member is attached thereto.

* * * * *